(12) United States Patent
Kronenberger (10) Patent No.: US 9,434,282 B2
(45) Date of Patent: Sep. 6, 2016

(54) METHOD OF FORMING A BARRIER BETWEEN ADJACENT SEATING REGIONS

(71) Applicant: Robert Kronenberger, Deerfield, IL (US)

(72) Inventor: Robert Kronenberger, Deerfield, IL (US)

(*) Notice: Subject to any disclaimer, the term of this patent is extended or adjusted under 35 U.S.C. 154(b) by 0 days.

(21) Appl. No.: 14/493,556

(22) Filed: Sep. 23, 2014

(65) Prior Publication Data

US 2016/0082866 A1    Mar. 24, 2016

(51) Int. Cl.
| A47C 31/00 | (2006.01) |
| B60N 2/44  | (2006.01) |
| B64D 11/06 | (2006.01) |
| B61D 33/00 | (2006.01) |
| B63B 29/04 | (2006.01) |

(52) U.S. Cl.
CPC ............ B60N 2/44 (2013.01); B61D 33/0007 (2013.01); B64D 11/0606 (2014.12); B63B 29/04 (2013.01)

(58) Field of Classification Search
CPC  B60N 2/44; B61D 33/0007; B64D 11/0606; B63B 29/04
USPC ...................................... 297/464; 296/24.46
See application file for complete search history.

(56) References Cited

U.S. PATENT DOCUMENTS

| 4,118,812 | A | * | 10/1978 | Pangburn | B60N 2/28 5/513 |
| 4,938,401 | A | * | 7/1990 | Weisbrodt | B60R 7/043 108/44 |
| 5,054,837 | A | * | 10/1991 | Chapman | B60N 2/28 160/351 |
| 5,123,707 | A | * | 6/1992 | Wurzell | B60N 2/44 297/463.2 |
| 5,255,958 | A | * | 10/1993 | Frischmann | B60N 2/28 297/232 |
| 5,857,745 | A | * | 1/1999 | Matsumiya | B60N 2/34 244/118.6 |
| 5,954,401 | A | * | 9/1999 | Koch | B60N 2/242 297/147 |
| 5,971,487 | A | * | 10/1999 | Passehl | B60N 2/28 108/44 |
| 6,113,183 | A | * | 9/2000 | Koch | B64D 11/0606 297/162 |
| 6,142,574 | A | * | 11/2000 | Alexander | B60N 2/441 297/188.2 |
| 6,170,786 | B1 | * | 1/2001 | Park | B60N 2/0232 248/274.1 |
| 6,260,903 | B1 | * | 7/2001 | von der Heyde | B60N 2/2821 296/24.46 |
| 6,669,259 | B2 | * | 12/2003 | Murray | B60R 7/14 296/24.46 |
| 7,178,871 | B1 | * | 2/2007 | Round | B60N 2/242 297/217.3 |
| 7,562,931 | B2 | * | 7/2009 | Stojanovic | B60N 2/3013 296/24.4 |
| 7,641,278 | B2 | * | 1/2010 | Strasser | B64D 11/0606 244/118.6 |
| 8,091,961 | B2 | * | 1/2012 | Dryburgh | B60N 2/01 297/184.1 |
| 8,272,674 | B2 | * | 9/2012 | Vance | B60N 2/441 296/24.46 |
| 2003/0146654 | A1 | * | 8/2003 | Nguyen | B64D 11/0606 297/463.2 |
| 2004/0004382 | A1 | * | 1/2004 | Dowty | B64D 11/06 297/354.1 |
| 2007/0085389 | A1 | * | 4/2007 | Schurg | B64D 11/06 297/184.1 |
| 2016/0046215 | A1 | * | 2/2016 | Lebowitz | B60R 5/00 296/24.46 |

* cited by examiner

*Primary Examiner* — Rodney B White
(74) *Attorney, Agent, or Firm* — Wood, Phillips, Katz, Clark & Mortimer (57) ABSTRACT

A method of selectively forming a barrier between adjacent seating regions at which first and second support surfaces are respectively located, with the first and second support surfaces configured to support first and second persons in laterally spaced sitting positions. The method includes the steps of: obtaining a barrier assembly having at least one wall structure that is configured to be selectively changed between: a) a storage state; and b) an operative state; and changing the barrier assembly from the storage state into the operative state wherein an exposed surface of the at least one wall structure is situated to obstruct lateral movement of at least one of: a) an arm; b) a leg; c) a head; or d) a torso of a person in the sitting position in the first region into the second seating region.

16 Claims, 7 Drawing Sheets

METHOD OF FORMING A BARRIER BETWEEN ADJACENT SEATING REGIONS

BACKGROUND OF THE INVENTION

1. Field of the Invention

This invention relates to laterally adjacent seating arrangements, such as on public/mass transportation systems, and, more particularly, to an assembly that can be used to create a temporary barrier to prevent intrusion by one seated person into the space of a person seated laterally adjacent to the one person.

2. Background Art

The trend worldwide in mass/public transportation has been to redesign seating so that space is more efficiently utilized. Essentially, this has involved fitting more passengers in the same space. Usually cost savings and efficiency are drivers for this exercise. However, often operators of mass/public transportation systems utilizing trains, buses, airplanes, boats, etc., boost profit at the expense of the comfort of their riders/users, who are not afforded the same volume of space to reside in and oftentimes are in cramped quarters.

Generally, passenger seats, such as on aircraft, are designed in basic travel class to accommodate a person of average build. While some airlines have restrictions that may preclude an exceptionally large person from occupying only a single seat, generally there are no size restrictions on passengers. As a result, passenger comfort is hit-or-miss, depending upon the size of an adjacent passenger or passengers. It is not uncommon for an individual in a middle seat to be bounded by large individuals who take up their own allotted space and additionally intrude into the space intended for the occupant of the middle seat.

When one is confronted with a space shortage, the options are few. He/she can contend with the potential inconvenience/discomfort. This may be practical for short trips. However, for long trips, steps may have to be taken to "protect one's space".

A passenger may politely (or impolitely) advise an adjacent passenger of his/her space intrusion. Sometimes a situation may be remedied by this approach. However, oftentimes individuals are incapable of keeping their body fully in a small allotted space.

Even in situations where adjacent passengers are not particularly large, there still exists a problem with space intrusion. As people sleep on airlines, they tend to lean or collapse, which may result in individuals shifting head, shoulders, and/or arms into an adjacent passenger's space. Again, a potentially awkward situation arises when an intruding passenger must be confronted.

In spite of the millions of passengers that travel regularly on mass/public transportation systems, heretofore those experiencing the above problems have had few options, other than those described above. Transportation personnel will generally not get involved to remedy these situations. Movement to a special class with wider seating may strain budgets and, in the end, may not eliminate the problem of space intrusion.

The result of the above problems is that passengers are often unhappy and at times attempts between passengers to compromise may escalate to the point that there is outward hostility between passengers who are often required to share a relatively compact space. This becomes an increasing problem as there is a worldwide sensitivity to avoiding any disruption on public/mass transportation because of safety concerns, particularly on large airliners.

The airline, rail, bus, watercraft, etc. industries would welcome any practical solution to the above problems. However, to date no practical solutions, known to the inventor herein, have been devised.

SUMMARY OF THE INVENTION

In one form, the invention is directed to a method of selectively forming a barrier between adjacent seating regions at which first and second support surfaces are respectively located. The first and second support surfaces are configured to support first and second persons in laterally spaced sitting positions. The method includes the steps of: obtaining a barrier assembly having at least one wall structure that is configured to be selectively changed between: a) a storage state; and b) an operative state; and changing the barrier assembly from the storage state into the operative state wherein an exposed surface of the at least one wall structure is situated to obstruct lateral movement of at least one of: a) an arm; b) a leg; c) a head; or d) a torso of a person in the sitting position in the first region into the second seating region.

In one form, the first and second support surfaces are part of a seating structure and the step of obtaining a barrier assembly involves obtaining a barrier assembly that has at least a portion thereof that is fixedly secured to the seating structure.

In one form, the first and second support surfaces are part of a seating structure and the step of obtaining a barrier assembly involves obtaining a barrier assembly that is configured to be fully separable from the seating structure.

In one form, the step of obtaining a barrier assembly involves obtaining a barrier assembly having at least one connecting component that cooperates with at least one connecting component on the seat structure to maintain the barrier assembly in the operative state.

In one form, the exposed surface of the at least one wall structure has an area. The barrier assembly is configured so that the area of the exposed surface of the at least one wall structure is less with the barrier assembly in the storage state than in the operative state.

In one form, the at least one wall structure has a plurality of parts that are moved by at least one of: a) folding; and b) pivoting relative to each other to change the barrier assembly between the storage and operative states.

In one form, the at least one wall structure has a region with a plurality of accordion-type folds that are configured to permit the region to be reconfigured as the barrier assembly is changed between the storage and operative states.

In one form, at least a portion of the exposed surface of the at least one wall structure has a substantially planar shape.

In one form, the first and second support surfaces are part of a seating structure that is located in one of: a) an airplane; b) a bus; c) a watercraft; and d) a train.

In one form, the step of changing the barrier assembly from the storage state into the operative state involves moving the barrier assembly so that at least a part of the barrier assembly is frictionally held between first and second structures on the seating structure.

In one form, the first structure is part of an arm rest and the second structure is a cushion defining one of the support surfaces.

In one form, the first and second structures are separate back rests for persons in sitting positions on the first and second support surfaces.

In one form, the method further includes the step of transporting the barrier assembly to the one of the airplane, bus, watercraft, and train.

In one form, the method further includes the step of changing the barrier assembly back into the storage state by reconfiguring the barrier assembly after use.

In one form, the step of reconfiguring the barrier assembly involves compacting the barrier assembly so that no dimension of the compacted barrier assembly exceeds 12 inches.

In one form, the method further includes the step of discarding the reconfigured barrier assembly after use.

In one form, the method further includes the steps of obtaining a storage container and placing the reconfigured barrier assembly in the storage container.

In one form, the step of changing the barrier assembly from the storage state into the operative state involves joining separate connectors on the barrier assembly and seating structure to thereby maintain the barrier assembly in the operative state.

In one form, the invention is directed to a barrier assembly as described above.

In one form, the barrier assembly is provided in the operative state on one of: a) an airplane; b) a bus; c) a watercraft; and d) a train.

DETAILED DESCRIPTION OF THE PREFERRED EMBODIMENT

Figure 1:
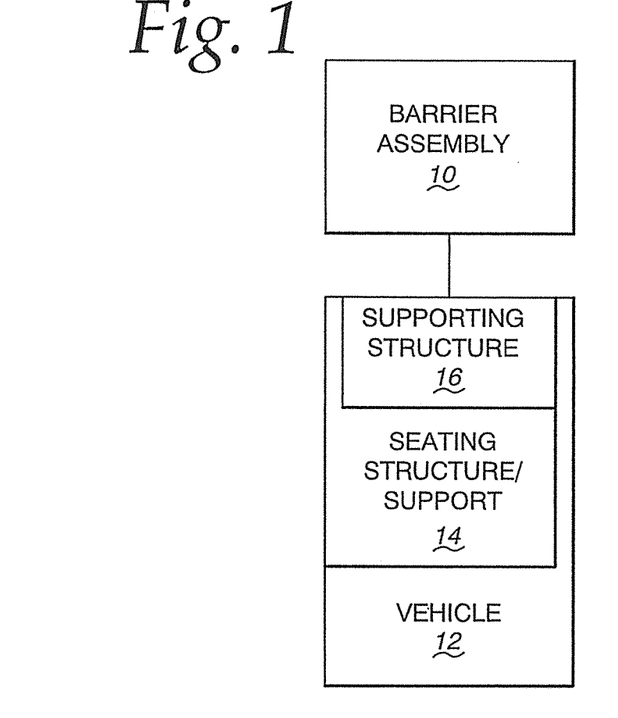
FIG. 1 is a schematic representation of a barrier assembly, according to the invention, that is in an operative state upon a supporting structure on a public/mass transportation vehicle.

In FIG. 1, a barrier assembly 10, according to the invention, is shown in schematic form in relationship to a vehicle 12 having an integrated seating structure/support 14 upon which persons are permitted to assume sitting positions in laterally spaced relationship. The barrier assembly 10 cooperates with any suitable supporting structure, as shown at 16, that may cooperate with, or be part of, the seating structure/support 14 to maintain the barrier assembly 10 in its operative state. The supporting structure 16 may be on the seating structure and/or support therefor. For purposes of simplicity, the seating structure and support are identified as the same structure since the seating structure would typically be fixedly attached to a support, such as a floor, so that the seating structure and support together define a base upon which the barrier assembly 10 can be mounted in the operative state.

The barrier assembly 10 is changeable to a storage state by reconfiguring the barrier assembly 10 while it is maintained upon the seating structure/support 14 or by separating the barrier assembly 10 from the seating structure/support 14.

FIG. 1 is intended to encompass virtually any type of interacting structure between the barrier assembly 10 and vehicle 12 to maintain the barrier assembly in its operative state. For example, the barrier assembly 10 might be simply frictionally held between parts on the seating structure/support 14.

Figure 2:
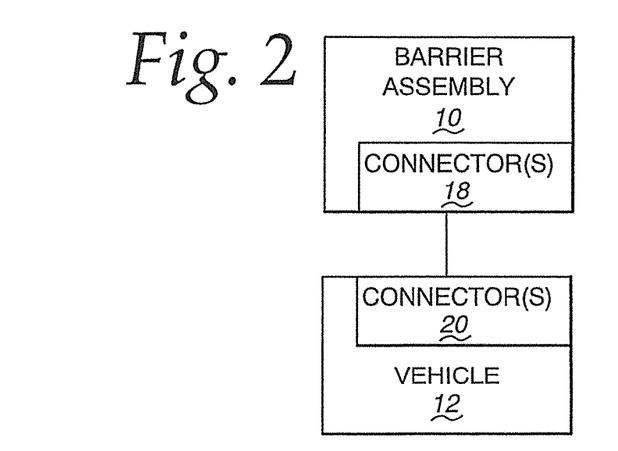
FIG. 2 is a schematic representation of structure for maintaining the barrier assembly in FIG. 1 in an operative state upon the vehicle.

Alternatively, as shown in FIG. 2, the barrier assembly 10 may have one or more connectors 18 to interact with one or more connectors 20 on the vehicle 12. The connectors 18, 20 may be releasably joined or permanently joined.

The schematic representations in FIGS. 1 and 2 are intended to encompass the specific embodiments and environments hereinafter described, as well as others that may be modified, in terms of how the components are configured and interact, from the exemplary embodiments herein described. The embodiments specifically described are exemplary in nature only, as virtually an unlimited number of different variations thereof could be readily devised by one skilled in the art with the teachings herein in hand.

Figure 3:
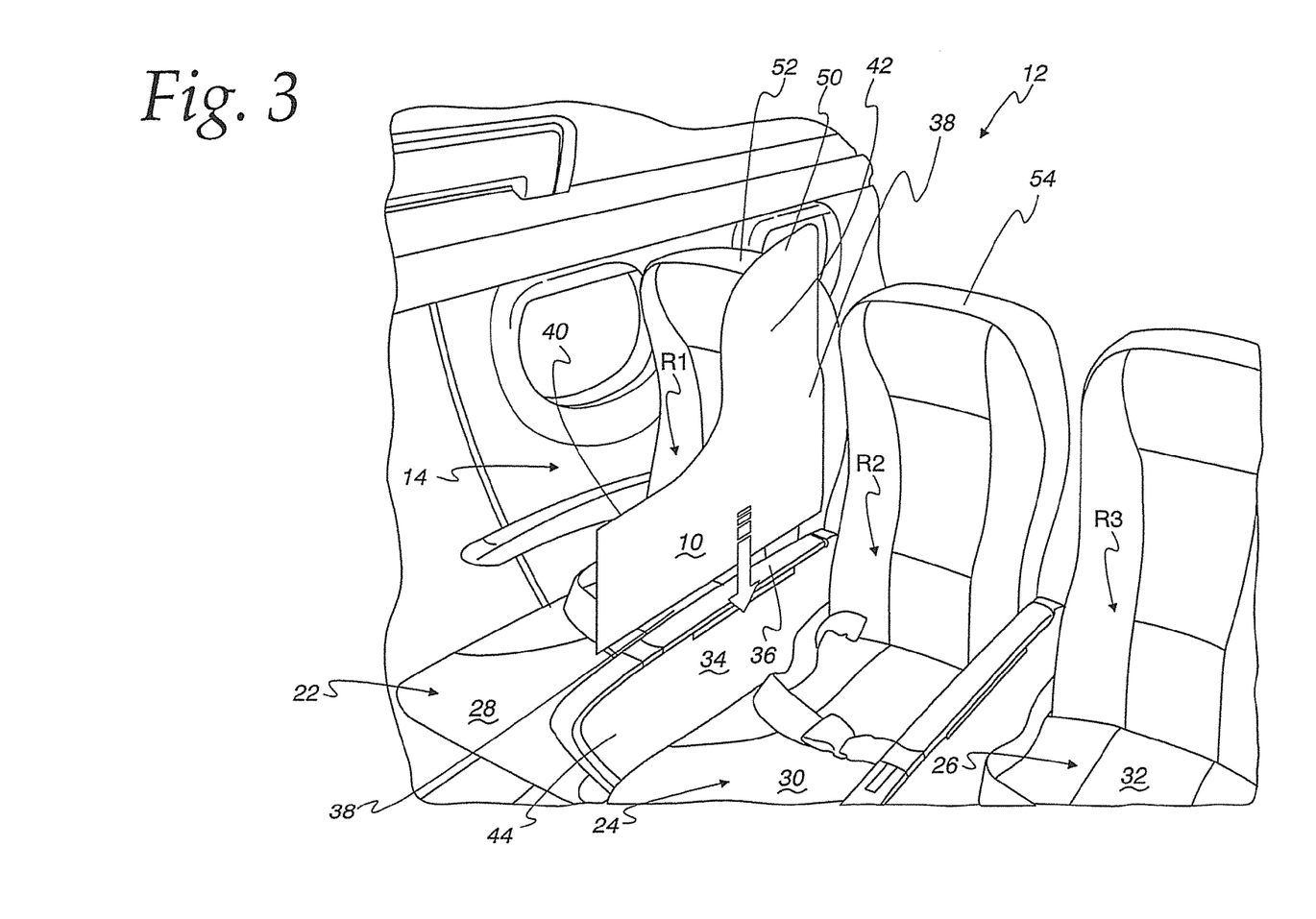
FIG. 3 is a fragmentary, perspective view of seating structure within a compartment on a mass/public transportation vehicle and showing one form of the barrier assembly positioned to be placed in its operative state.

One exemplary configuration for both the vehicle 12 and seating structure 14 is shown in FIGS. 3-6. The seating structure 14 depicted is one that is typical to those used in any of an airplane, bus, watercraft, and train to transport passengers on a mass basis, through public or private funding. As depicted in FIG. 3, each separate seating structure 14 consists of three laterally adjacent seats 22, 24, 26, each with the same basic configuration and defining adjacent seating regions R1, R2, R3 for persons in sitting positions on upwardly facing, cushioned support surfaces 28, 30, 32.

The seating regions R1, R2, R3 are separated by armrests. For example, seating regions R1, R2 are separated by an upstanding armrest 34 with an upwardly facing surface 36 shared by the occupants of the seats 22, 24.

As explained in the Background portion herein, there is no structure that keeps the occupant of either seat 22, 24 from moving his/her head, arms, legs, and/or torso into the adjacent passenger's region. The barrier assembly 10 is configured to prevent intrusion, or at least limit the ease with which one passenger can intrude, upon the space of a laterally adjacent passenger.

In this embodiment, the barrier assembly 10 is shown as a substantially flat/planar wall structure 38 with an overall "L" shape. The L shape is not critical but exemplary of one preferred form. The wall structure 38 defines oppositely exposed surfaces 40, 42, respectively facing the regions R1, R2.

Figure 4:
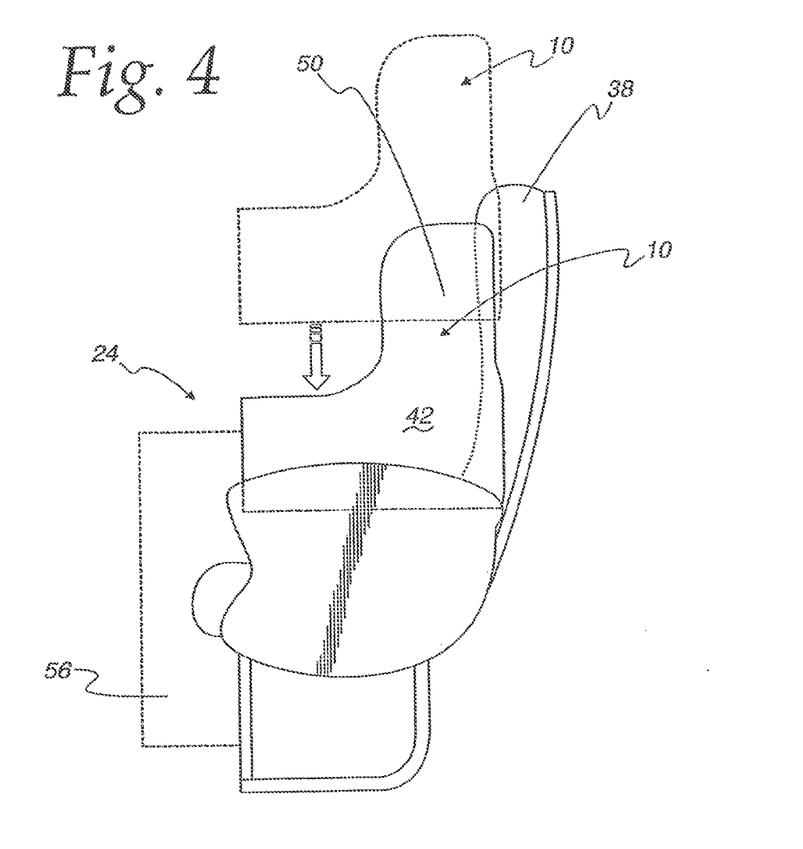
FIG. 4 is a side elevation view of one of the seats in FIG. 3 showing the barrier assembly being moved towards its operative state and in its operative state, respectively in dotted and solid lines.

In this embodiment, the barrier assembly 10 can be directed from a separated position, as shown in FIG. 3 and in dotted lines in FIG. 4, to between a surface 44 on the armrest 34 and a surface 46 on a cushion 48 defining the support surface 30. Typically, the cushion 48 will be wedged tightly against the armrest surface 44, thereby allowing the flat wall structure 38 to be simply pressed between the laterally facing surfaces 44, 46 to become wedged and thereby frictionally held between the surfaces 44, 46 in its operative state, as shown in solid lines in FIG. 4.

In the operative state for the barrier assembly 10, the surface 40 extends along the fore-and-aft dimension of the armrest 34 to thereby block/interfere with movement of the arms of a person in a sitting position on the seat 22 into the region R2. Another portion, i.e., the other leg of the "L", at 50, projects upwardly and between back rests 52, 54 on the seats 22, 24, respectively. The portion 50 projects forwardly from the back rests 52, 54 sufficiently so that the surface 40 blocks/interferes with movement of the head of a person in a sitting position on the seat 22 into the region R2.

Optionally, the flat wall structure 38 may extend beyond the aforementioned "L" shape, as shown in FIG. 1, to define a portion 56 that coincides with where the legs of the persons in the sitting positions reside on the seats 22, 24, to prevent intrusion of the legs of persons sitting in regions R1, R2 into the other regions R2, R1.

Figure 5:
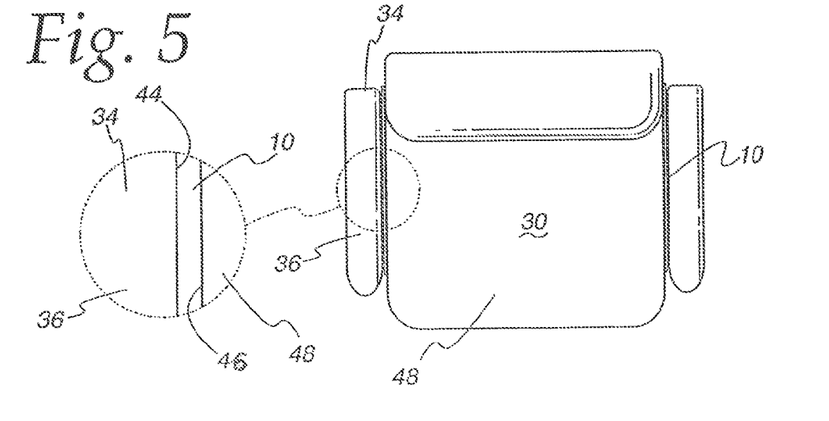
FIG. 5 is a plan view of the seat in FIG. 4 with two separate barrier assemblies shown in their operative states.

As seen in FIG. 5, the occupant of the seat 24 may use two barrier assemblies 10, with the second barrier assembly 10 utilized between regions R2, R3, in like fashion.

The barrier assembly 10 may be made as a single piece with a substantially fixed shape. However, preferably, the barrier assembly 10 is made with a collapsible body 58, with details of one form thereof shown in FIG. 6. The body 58 is depicted with a plurality of preformed fold lines FL which allow strategic folding of the body 58 to a compacted storage state, preferably wherein no dimension of the folded body 58 exceeds 12 inches.

In one preferred form, the barrier assembly 10 is a structure completely separable from the vehicle 12, though this is not a requirement. With the fully separable structure, the body 58 can be compacted and placed in a storage container 60 which allows the convenient transportation thereof to and from the vehicle 12 by the user. For example, a user may keep the barrier assembly 10 in the storage container 60 as a normal carry-on item that can be conveniently brought to the user's seat. Once in the vehicle 12, the user can reconfigure the barrier assembly 10 and place it in its operative state with respect to his/her particular seat.

Alternatively, an operator of mass/public transportation may make the barrier assemblies 10 available, as in a fixed shape. The barrier assemblies 10 might be stored in a bulk supply within the vehicle 12 to be made available to passengers. The barrier assembly 10, whether transported to the vehicle 12 by the user or provided by the vehicle operator, may be of such a construction that it can be either reused or disposed of after use.

The invention contemplates virtually an unlimited number of different ways of maintaining the barrier assembly 10, or variations thereof in the depicted embodiments, in an operative state. The embodiment in FIGS. 4-6 may rely strictly upon frictional forces between parts/structures on the seats and the barrier assembly 10 to maintain the same in its operative state. If only frictionally held, the barrier assembly might be readily shifted horizontally and/or vertically to optimize its effectiveness.

Figure 7:
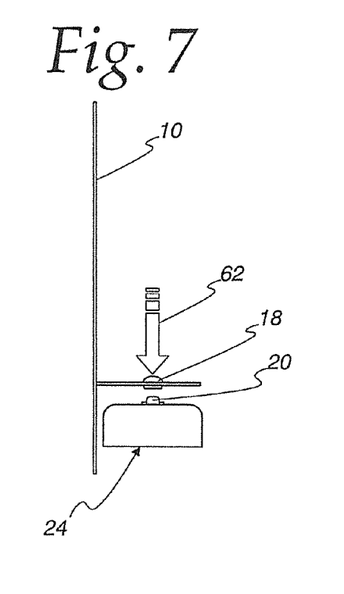
FIG. 7 is a fragmentary, elevation view showing cooperating connectors on the barrier assembly and vehicle that can be used to releasably maintain the barrier assembly in its operative state.

Within the schematic showing in FIG. 2, the invention contemplates that the aforementioned connectors 18, 20 might be used in place of or in conjunction with the frictional connection. For example, as shown in FIG. 7, the seat 24 may incorporate the aforementioned connector 20 in the form of a snap part, cooperating with a snap part 18 on the barrier assembly 10. The connectors/snap parts 18, 20 are joined by moving the connector/snap part 18 in the direction of the arrow 62 in FIG. 7 against the connector/snap part 20. This facilitates release of the barrier assembly 10 with complete separation thereof as desired.

Alternatively, the connectors 18, 20 might establish a permanent connection.

Within the schematic showing of FIG. 2 is contemplated any type of structure fixedly secured to the seating structure 14 that may cooperate with the barrier assembly 10 for releasable or fixed connection.

Figure 8:
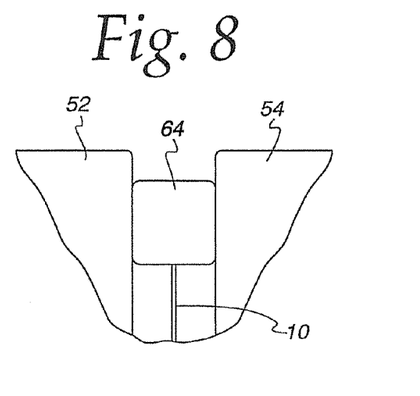
FIG. 8 is a fragmentary, elevation view showing a modified form of connection between the barrier assembly and adjacent seat back rests.

In FIG. 8, a modification is shown wherein the barrier assembly 10 has a component 64 that can be captively maintained between the back rests 52, 54, thereby to maintain the barrier assembly 10 in its operative state. The component 64 may be frictionally held between the back rests 52, 54 or otherwise suitably connected thereto.

To reduce the area of the surface 36 on the flat wall structure 38, thereby to compact the barrier assembly 10 as for transportation, various different structures are contemplated.

Figure 6:
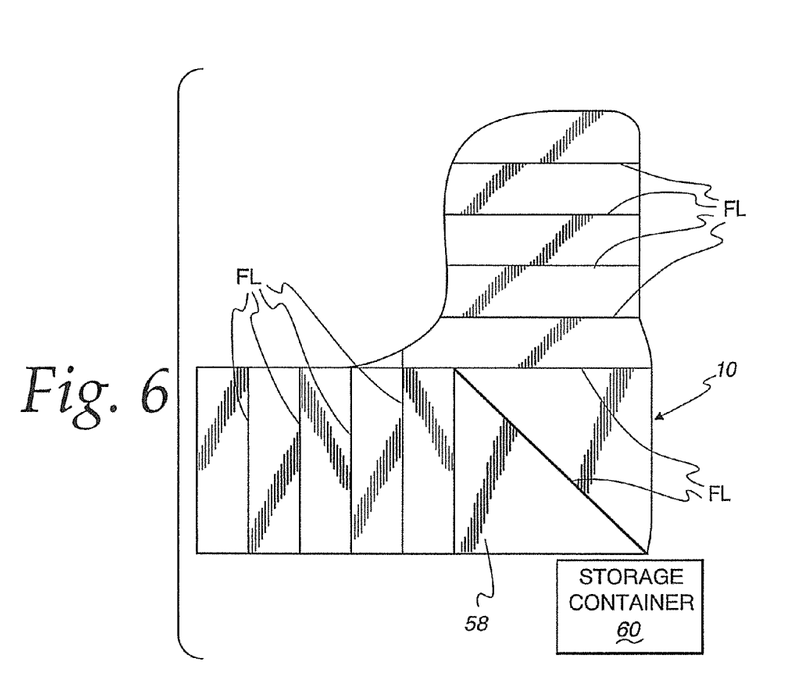
FIG. 6 is a side elevation view of the inventive barrier assembly in FIGS. 4 and 5 and showing various fold lines about which parts thereof can be moved to compact the barrier assembly.

As shown in FIG. 6, the fold lines FL effectively define separate parts that are moved relative to each other about the fold lines FL to effect aerial compaction. The fold lines FL may be defined by weakening perforations, scoring, etc.

Figure 9:
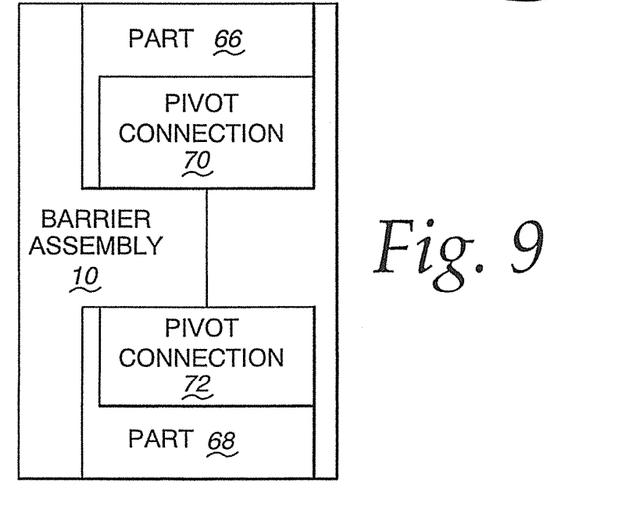
FIG. 9 is a schematic representation of an alternative pivot connection between parts that allow compaction of the barrier assembly.

Alternatively, separate parts 66, 68 of the barrier assembly 10 may be movable relative to each other by cooperating pivot connections 70, 72, as shown schematically in FIG. 9.

Figure 10:
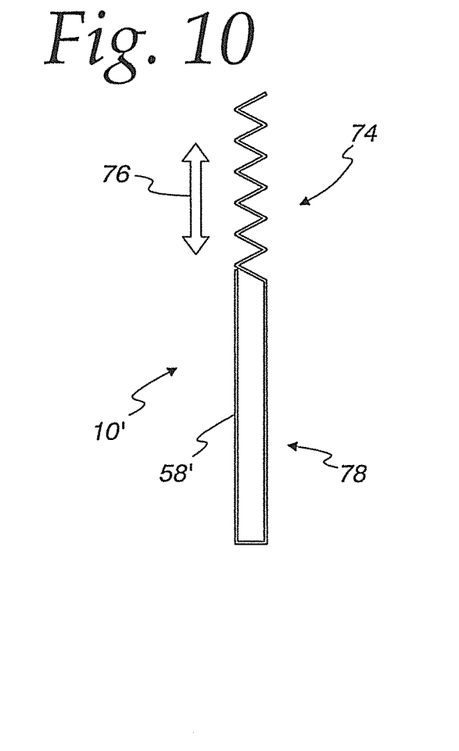
FIG. 10 is an elevation view of a modified form of the barrier assembly incorporating accordion-type folds to facilitate compaction thereof.

In FIG. 10 a barrier assembly 10' is shown wherein one region at 74 has accordion-type folds that allow expansion and contraction along the line indicated by the double-headed arrow 76 to thereby change the barrier assembly 10' between operative and storage states. The separate region at 78 may have a different construction, such as accordion folds with lines thereof extending in a different direction. Alternatively, the entire body 58' of the barrier assembly 10' may be made with the accordion folds all collapsing in the same direction.

Figure 11:
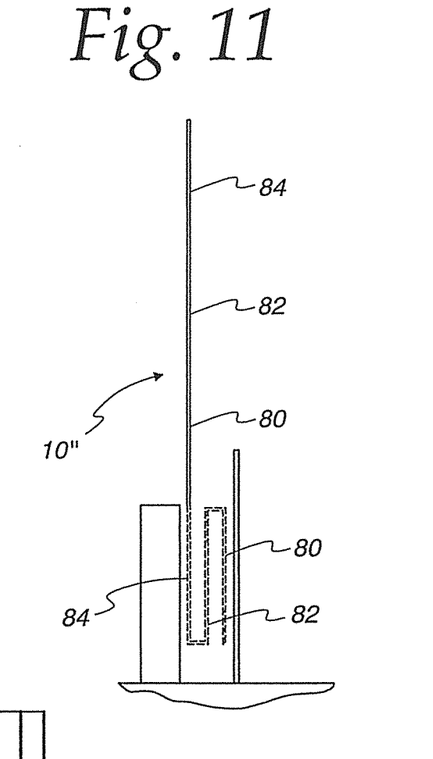
FIG. 11 is a fragmentary, front elevation view of a seat with a further modified form of barrier assembly, consisting of three parts which are shown in solid lines in an operative state and in dotted lines in a storage state.

In a further modified form, as shown in FIG. 11, the barrier assembly 10" has separate parts/panels 80, 82, 84 which extend, as shown in solid lines, and compact to an overlying relationship, as shown in dotted lines in FIG. 10, with the barrier assembly 10" in a storage state.

Figure 12:
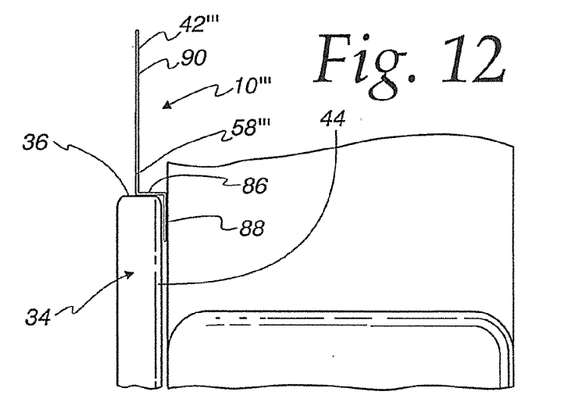
FIG. 12 is a fragmentary, front elevation view of a seat as in FIGS. 4 and 5 with a modified form of barrier assembly that rests atop an armrest.

In FIG. 12, a modified form of barrier assembly 10''' is shown wherein the barrier assembly body 58''' is offset to define a first portion 86 that bears on the surface 36 of the armrest 34, with a separate portion 88 depending from the portion 86 and overlying the armrest surface 44. This allows a vertical wall portion 90 defining the surface 42''' to be centered laterally along the armrest surface 36, so as to give the occupant of each of the regions R1, R2 access to one half the width thereof.

Figure 13:
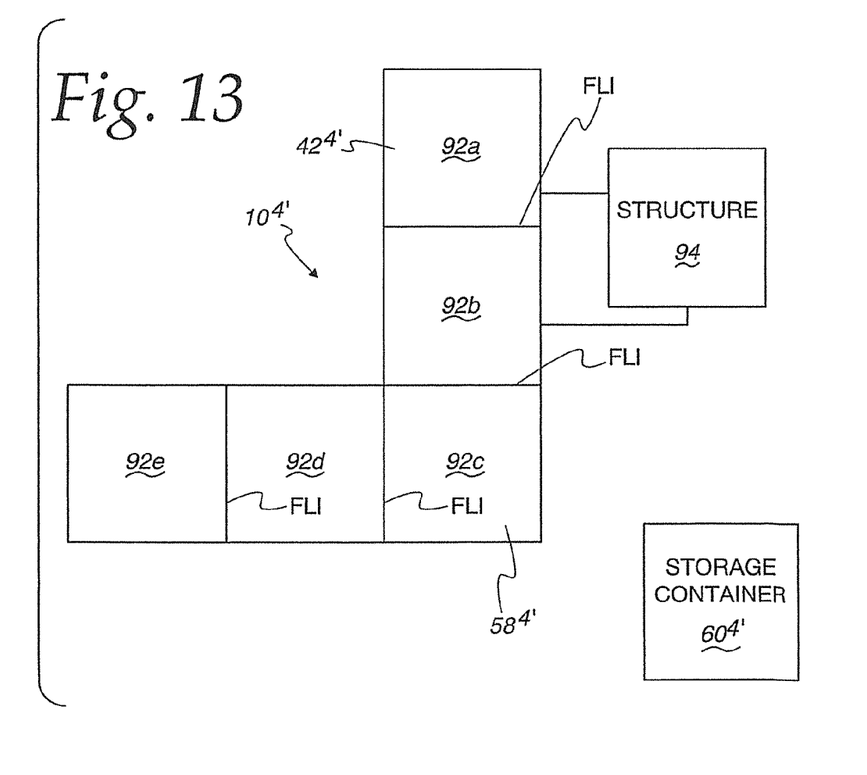
FIG. 13 is a side elevation of a modified form of barrier assembly with a folding arrangement generally as shown in FIG. 6.

In FIG. 13, a further modified form of barrier assembly is shown at $10^{4'}$. In this embodiment, the body $58^{4'}$ is made from folding panels 92a, 92b, 92c, 92d, 92e, each having the same general square shape. The panels 92a-92e are movable relative to each other around fold lines FL1 and allow the combined surface $42^{4'}$ defined thereby to be reduced to the area of one of the panels 92a-92e. Structure 94 may be provided between any of the panels 92a-92e to releasably or permanently fix the same in a desired coplanar relationship.

When collapsed, the body $58^{4'}$ may be disposed of or placed in a storage container $60^{4'}$.

Figure 14:
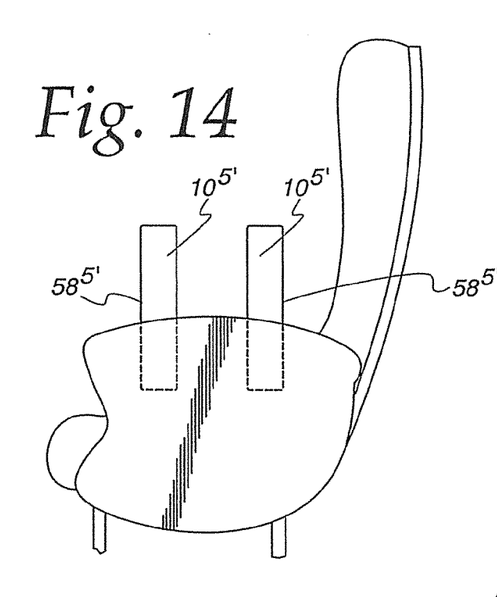
FIG. 14 is a side elevation view of a seat with a plurality of a further modified form of barrier assembly shown in operative states thereon.

While the barrier assemblies described hereinabove have had a generally "L" shape, this is not a requirement. In FIG. 14, barrier assemblies $10^{5'}$ are shown having a more simplified construction. Each of the barrier assemblies $10^{5'}$ is in the form of an elongate body $58^{5'}$ that may have a fixed configuration or be reconfigurable, as shown alternatively in FIGS. 15 and 16. Each of the barrier assemblies $10^{5'}$ can be placed strategically to block movement of an adjacent passenger's arm, leg, torso, or head.

Figure 15:
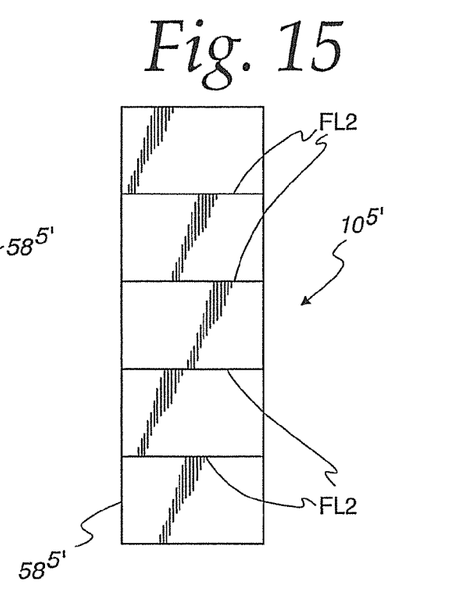
FIG. 15 is a side elevation view of one of the barrier assemblies in FIG. 14 and showing fold lines that permit compaction thereof.

As shown in FIG. 15, the body $58^{5'}$ may be collapsed by movement of parts thereof around fold lines FL2, as in the pattern shown or in an alternative pattern.

Figures 16, 17:
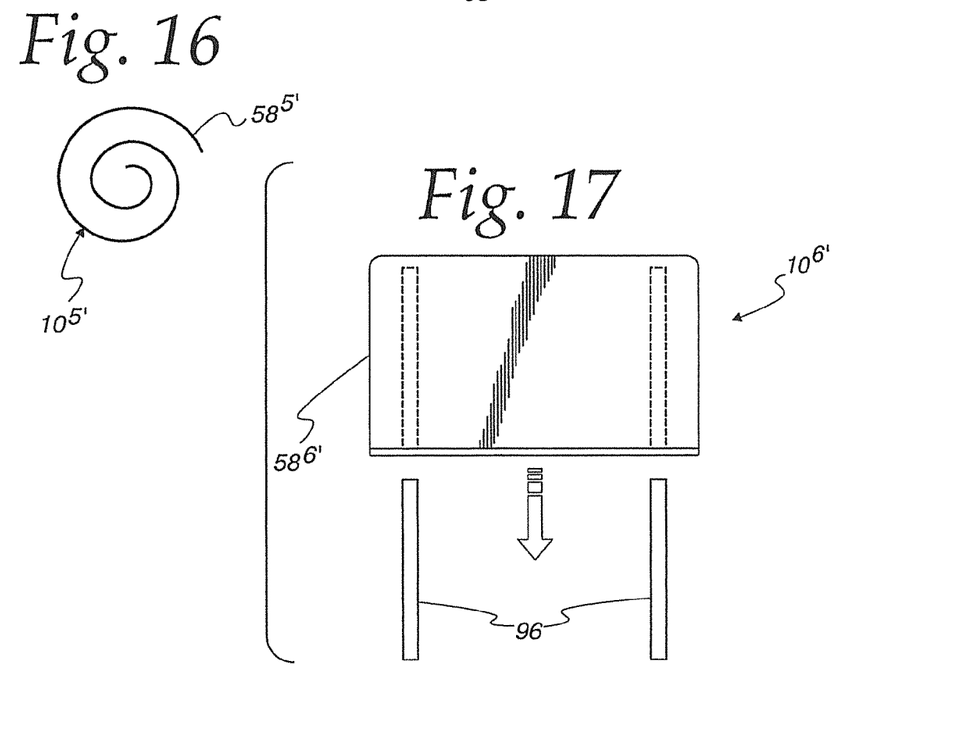
FIG. 16 depicts one of the barrier assemblies in FIGS. 14 and 15 compacted by being rolled into a spiral shape.
FIG. 17 is an exploded, side elevation view of a further modified form of barrier assembly.

As shown in FIG. 16, the body $58^{5'}$ may be rolled into a spiral shape to effect compaction thereof.

In FIG. 17, a further modified form of barrier assembly is shown at $10^{6'}$. The barrier assembly $10^{6'}$ utilizes one or more support structures 96 that may be attached to or a part of an existing seat structure. The body $58^{6'}$ of the barrier assembly $10^{6'}$ may be slid over the support structure 96 to maintain the barrier assembly $10^{6'}$ in its operative state.

The foregoing disclosure of specific embodiments is intended to be illustrative of the broad concepts comprehended by the invention.

The invention claimed is:

1. A method of selectively forming a barrier between adjacent seating regions on a seating structure at which first and second support surfaces are respectively located, the first and second support surfaces configured to support first and second persons in laterally spaced sitting positions, the method comprising the steps of:
    obtaining a barrier assembly comprising at least one wall structure that is configured to be selectively changed between: a) a storage state; and b) an operative state;
    transporting the barrier assembly from a location spaced from the seating structure to a location where the seating structure is present with the barrier assembly in the storage state;
    changing the barrier assembly from the storage state into the operative state wherein an exposed surface of the at least one wall structure is situated to obstruct lateral movement of at least one of: a) an arm; b) a leg; c) a head; or d) a torso of a person in the sitting position in the first region into the second seating region;
    separating the barrier assembly from the seating structure after use;
    changing the separated barrier assembly from the operative state back into the storage state; and
    transporting the separated barrier assembly away from the location where the seating structure is present,
    wherein the step of changing the barrier assembly from the storage state into the operative state comprises moving the barrier assembly relative to laterally facing surfaces on first and second structures on the seating assembly so that the barrier assembly is held in the operative state by reason of a part of the barrier assembly being wedged, and thereby frictionally held, between the laterally facing surfaces on the first and second structures on the seating structure,
    at least one of the structures comprising a cushion against which a person sitting on the seating structure bears,
    at least one of the laterally facing surfaces moved laterally as the barrier assembly is changed from the storage state into the operative state to allow the barrier assembly to become wedged between the laterally facing surfaces.

2. The method of forming a barrier between adjacent seating regions according to claim 1 wherein the step of obtaining a barrier assembly comprises obtaining a barrier assembly that has at least a portion thereof that is fixedly secured to the seating structure.

3. The method of forming a barrier between adjacent seating regions according to claim 1 wherein the step of obtaining a barrier assembly comprises obtaining a barrier assembly comprising at least one connecting component that cooperates with at least one connecting component on the seat structure to releasably maintain the barrier assembly in the operative state.

4. The method of forming a barrier between adjacent seating regions according to claim 1 wherein the exposed surface of the at least one wall structure has an area and the barrier assembly is configured so that the area of the exposed surface of the at least one wall structure is less with the barrier assembly in the storage state than in the operative state.

5. The method of forming a barrier between adjacent seating regions according to claim 4 wherein the at least one wall structure has a plurality of parts that are moved by at least one of: a) folding; and b) pivoting relative to each other to change the barrier assembly between the storage and operative states.

6. The method of forming a barrier between adjacent seating regions according to claim 4 wherein the at least one wall structure has a region with a plurality of accordion-type folds that are configured to permit the region to be reconfigured as the barrier assembly is changed between the storage and operative states.

7. The method of forming a barrier between adjacent seating regions according to claim 1 wherein at least a portion of the exposed surface of the at least on wall structure has a substantially planar shape.

8. The method of forming a barrier between adjacent seating regions according to claim 1 wherein the first and second support surfaces are part of a seating structure that is located in one of: a) an airplane; b) a bus; c) a watercraft; and d) a train.

9. The method of forming a barrier between adjacent seating regions according to claim 1 wherein the first structure is part of an arm rest and the second structure is a cushion defining one of the support surfaces.

10. The method of forming a barrier between adjacent seating regions according to claim 1 wherein the first and second structures are separate backrests for persons in sitting positions on the first and second support surfaces.

11. The method of forming a barrier between adjacent seating regions according to claim 1 wherein the step of changing the separated barrier assembly from the operative state back into the storage state comprises compacting the barrier assembly so that no dimension of the compacted barrier assembly exceeds 12 inches.

12. The method of forming a barrier between adjacent seating regions according to claim 1 further comprising the step of discarding the reconfigured barrier assembly after use.

13. The method of forming a barrier between adjacent seating regions according to claim 1 further comprising the steps of obtaining a storage container and placing the barrier assembly in the storage container before transporting the separated barrier assembly away from where the seating structure is located.

14. The method of forming a barrier between adjacent seating regions according to claim 1 wherein the step of changing the barrier assembly from the storage state into the operative state comprises joining separate connectors on the barrier assembly and seating structure to thereby maintain the barrier assembly in the operative state.

15. A barrier assembly as recited in claim 1.

16. The barrier assembly according to claim 1 in the operative state on one of:
a) an airplane; b) a bus; c) a watercraft; and d) a train.

* * * * *

UNITED STATES PATENT AND TRADEMARK OFFICE
CERTIFICATE OF CORRECTION

| | | |
|---|---|---|
| PATENT NO. | : 9,434,282 B2 | Page 1 of 1 |
| APPLICATION NO. | : 14/493556 | |
| DATED | : September 6, 2016 | |
| INVENTOR(S) | : Robert Kronenberger | |

It is certified that error appears in the above-identified patent and that said Letters Patent is hereby corrected as shown below:

In the claims;

Claim 7 should read

7. The method of forming a barrier between adjacent seating regions according to claim 1 wherein at least a portion of the exposed surface of the at least one wall structure has a substantially planar shape.

Signed and Sealed this
Sixth Day of December, 2016

Michelle K. Lee
*Director of the United States Patent and Trademark Office*